Sept. 13, 1960 H. E. THOMPSON 2,952,145
SPLINE JOINT
Filed July 13, 1959 3 Sheets-Sheet 2

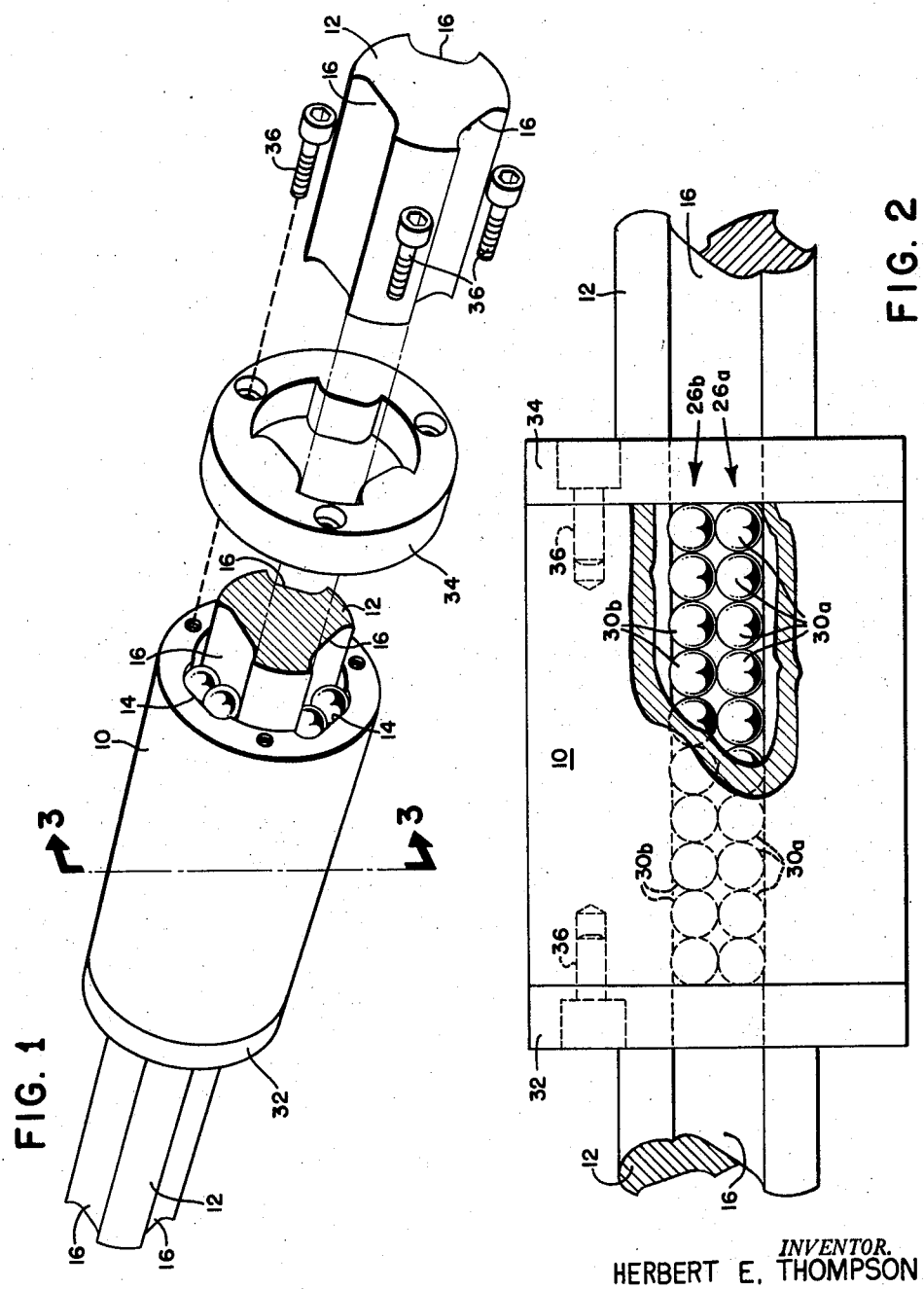

INVENTOR.
HERBERT E. THOMPSON
BY

Sept. 13, 1960     H. E. THOMPSON     2,952,145
SPLINE JOINT

Filed July 13, 1959     3 Sheets-Sheet 3

INVENTOR.
HERBERT E. THOMPSON

United States Patent Office 2,952,145
Patented Sept. 13, 1960

2,952,145

SPLINE JOINT

Herbert E. Thompson, San Jose, Calif., assignor to International Business Machines Corporation, New York, N.Y., a corporation of New York Filed July 13, 1959, Ser. No. 826,707

4 Claims. (Cl. 64—23)

The present invention relates to assemblies of the type comprising a hollow outer member within which is concentrically arranged an inner member that is free to slide in an axial direction relative to the outer member, but is restrained from rotational displacement relative to said outer member. More particularly, the present invention relates to assemblies known as spline joints, which comprise an outer tubular shaft within which is arranged an inner shaft in such a manner that the outer and inner shafts are restrained from rotational displacement relative to each other, but are free to move relative to each other in an axial direction. Thus, they may be shifted relative to each other while rotating in unison in response to torque applied to one or the other, or while resisting rotation when torque is applied to one while the other is held against rotation.

The simplest way of establishing the described cooperation between two members, of the type referred to, is to provide a longitudinal key on one of said members, which engages slidably a corresponding groove or race provided along the adjacent surface of the other member. However, when torque is applied to one of said members while the other is held in a stationary position, or if the other member is of substantial weight or inertia and resists rotation, the friction set up between the key and the groove is considerable and may make it difficult, if not impossible, to shift one member with regard to the other.

Attempts have been made to reduce the friction between the interengaged members of spline joints by interposing between the opposed surfaces of the coupled members an axial row of rollers. If these rollers are individually pivoted to one of the coupled members and are engaged within a groove or race provided in the other, the arrangement produces a measure of success in reducing friction between the coupled members, but the success is bought at a very substantial increase in cost. In addition pivoted rollers make it necessary to tolerate a certain amount of looseness between the coupled members in the direction of rotation, because the groove or race within which the rollers are engaged has to be somewhat wider than the diameters of said rollers. This is necessary to limit contact of the rollers with the race to one side thereof during practical performance of the spline joint, i.e. the side against which the rollers are urged depending upon the direction of the torque applied to one or the other of the interengaged shafts. From the opposite side of the race the rollers must be spaced during operation so as to be able to roll freely; for if they contacted both sides of the race, the opposite and substantially equal rotational moments applied to each roller at the opposite points of contact with the race, would oppose rotation of the rollers about their pivots causing them to "freeze" and slide rather than roll along the race so that they would in fact act in much the same manner as an ordinary key.

It has also been proposed to couple the inner and outer members of an assembly, of the type here under consideration, by a single row of loose spheres or balls located in and between congruent races provided in the inner surface of the outer member and the outer surface of the inner member. Since such balls are not pivoted to any of the interengaged members, such an arrangement is less costly to produce than the above discussed arrangement wherein each roller is pivoted to one of said members. However, to retain the balls in place when one of the members is shifted relatively to the other, they must be confined to one of the races, i.e., usually the race provided in the shorter member, by blocking the ends of said particular race. When this is the case, they are unable to roll along the race within which they are confined, but may at best spin with regard to said race. In practice, when an attempt is made to axially shift members that are coupled by a single row of balls in the manner described above, i.e. with the opposite ends of one of the congruent races blocked, the balls will roll over and along the race whose ends are unblocked and advance relative to said race, but they are unable to advance along the race whose ends are blocked and may only spin with regard to said race. When pressure is applied to the balls by the member to which an external torque is imparted and as a result thereof said balls are forced against the race in the other member, the friction set up between the balls and the surface of the blocked race may quickly become so great that the balls "freeze." Thus, they roll neither with regard to the unblocked race, nor do they spin with regard to the blocked race. Such an arrangement then acts merely in the manner of a key, with all the disadvantages of key-coupled assemblies, and with the additional disadvantage of rapidly wearing out both the balls and the races.

A way has been found to employ a single row of balls for coupling interengaged shafts efficiently and effectively for rotational movement in unison while permitting relative axial displacement of said members with a minimum of friction. To prevent the balls from disengaging themselves from the assembly whenever the interengaged members are shifted relative to each other, without confining the row of balls in any one of the races by blocking the ends thereof, the race in one of the interengaged members may be provided with a return path extending through the interior or along the outer surface of said member so that the balls are free to roll along and in this manner change position relative to both of the races. From the point of view of performance this may be an ideal solution, but such an arrangement is complex and its cost is prohibitive for many practical purposes. Also, it tends to increase the bulk of the assembly.

Generally it is an object of my invention to provide means for coupling interengaged members in assemblies, of the type referred to, in a simple and inexpensive, yet efficient and effective manner for rotation in unison while permitting said members to shift relative to each other in an axial direction with a minimum of rubbing friction between the balls and the races.

More particularly it is an object of my invention to provide an assembly, of the type referred to, wherein the interengaged members are effectively coupled by balls in a manner permitting axial displacement of said members relative to each other with a minimum of rubbing friction, without going to the expense of providing a return channel for the ball-carrying race of either one of said members.

Another object of the invention is to provide an assembly, of the type referred to, wherein the interengaged members are effectively coupled by rows of balls for rotation in unison and for relative axial displacement with a minimum of friction, although the race for the balls in one of said members may have its ends blocked to prevent loss of the balls from the assembly.

Still another object of my invention is to provide an effective and efficient ball-coupled assembly, of the type referred to, that creates a minimum of friction between the coupling balls and the walls of the races in which they are seated and which permits said balls to rotate freely and roll along one race while spinning with regard to the other, although they are confined in one of the races.

These and other objects of the present invention will be apparent from the following description of the accompanying drawings which illustrate certain preferred embodiments thereof and wherein:

Figure 1 is a perspective of a shaft assembly embodying my invention;

Figure 2 is a side elevation of the assembly shown in Figure 1 with part of its wall broken away to expose structure underneath;

Figure 3:
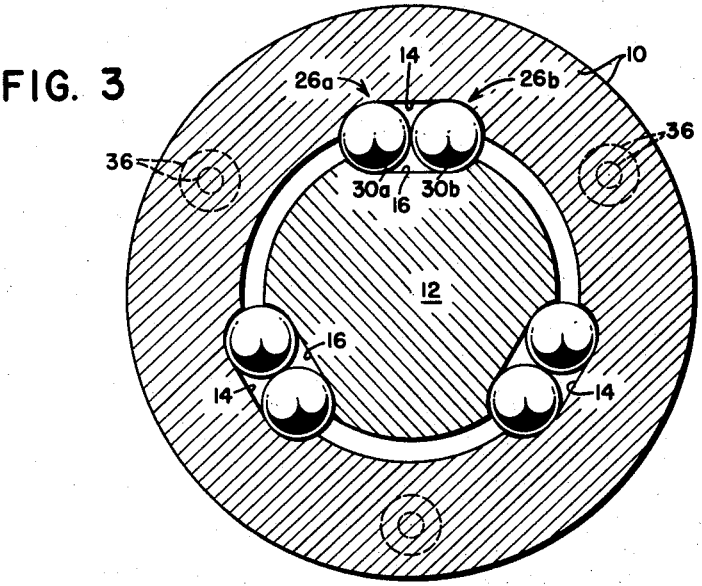
Figure 3 is a vertical cross section through the assembly illustrated in Figures 1 and 2 taken along the plane 3—3 of Figure 1.

Having first reference to the embodiment of the invention illustrated in Figures 1, 2, 3 and 4, the reference numeral 10 designates an outer tubular shaft section of relatively short axial length, which embraces an inner shaft 12 that is of substantially greater axial length and whose diameter is somewhat smaller than the internal diameter of the outer shaft section. The inner surface of the outer tubular shaft section 10 is provided with three longitudinally extending shallow grooves or raceways 14 that are spaced equal angular distances apart, and the outer surface of the inner shaft 12 is similarly provided with three longitudinal grooves or races 16 that are aligned circumferentially with the grooves 14 as best shown in Figure 3.

The grooves or races 14 and 16 have rounded corners and may have flat bottoms; and held in, and between the surfaces of each two congruent grooves 14, 16 are two parallel rows 26a and 26b of juxtaposed, smoothly surfaced balls or spheres 30a and 30b of equal size and of a hard material, such as steel. As is particularly apparent from Figure 4, the diametrical size of the balls is so chosen with regard to the width and depth of the grooves or races 14 and 16, that each two juxtaposed balls 30a and 30b contact not only the surfaces of both the grooves 14 and 16, but contact each other as well. The number of balls in each row is such that the rows extend along the total axial length of the outer tubular shaft section 10 (Figure 2), and to prevent the balls from dropping out of said shaft section, as said section and the inner shaft are shifted relative to each other in an axial direction, apertured retaining caps or disks 32 and 34 are secured to the ends of the tubular shaft section 10 by means of threaded bolts as indicated at 36 in Figure 1.

The twin rows of balls between the congruent grooves in the inner surface of the outer shaft section and the outer surface of the inner shaft section act in the normal manner to couple the two concentrically arranged shafts for rotation in unison whenever a torque is applied to one and the other is mounted for rotation, or vice versa and, they enable each shaft to resist rotation and remain in stationary condition in spite of torque applied thereto whenever the other is rigidly supported against rotation. In addition, the described arrangement permits the two shafts to shift axially relative to each other whether they are held in a stationary condition or rotate in unison in response to torque applied to one of them; and due to the particular arrangement of the balls as described above, i.e. in double or twin rows with adjacent balls of the twin rows arranged to contact each other, the balls will always roll freely with regard to one of the shafts and spin with regard to the other, with surface points of zero velocity in contact with said other shaft, so that there is scarcely any rubbing or shifting friction between the balls and the interengaged shafts. As a result, the shafts may always be shifted relative to each other with ease and there will be practically no wear such as may deform the balls and erode the races.

Figure 4:
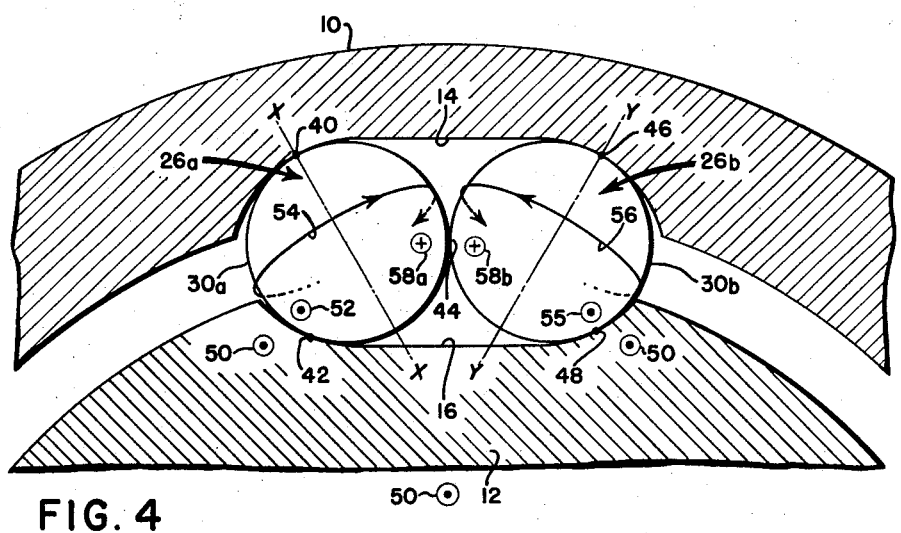
Figure 4 is an enlarged detail view of part of Figure 3.

Having now particular reference to Figure 4, each of the balls 30a of the left row 26a contacts the inner surface of the upper race 14 at point 40, the inner surface of the lower race 16 at point 42 and the adjacent ball 30b of the twin row 26b at point 44. Similarly each ball 30b of the right row 26b contacts the upper race 14 at point 46, the surface of the lower race 16 at point 48 and the adjacent ball of the left twin row 26a at the hereinbefore identified point 44. Let it be assumed that the inner shaft 12 is shifted relative to the outer shaft section 10 in a direction toward the person who views Figure 4 as indicated by the arrow head 50. When shaft 12 is moved in this manner, it tends to advance the adjacent area of the left ball 30a with which it is in contact at point 42, in the same direction as indicated by the arrow head 52. As a result of the moment thus applied to the balls 30a at point 42, each ball 30a begins to turn in the direction indicated by the arrow 54 about an axis X that passes through the point 40 whereat the ball contacts the surface of the upper race 14, and extends intermediately of point 42 whereat the rotational moment is applied to the ball and the point 44 whereat the ball bears against the labile surface presented by the adjacent ball 30b in the twin row 26b. If at point 44 the ball 30a would contact a stationary surface or a surface moving in the same direction as the surface with which it is in contact at point 40, as it would do if there were only a single row of balls in the congruent races 14 and 16, the opposite rotational moment applied to the ball 30a at point 44 would oppose, and prevent, rotation of said ball causing it to "freeze" and slide along the race 16 in the inner shaft 12 as said shaft is shifted relative to the outer shaft 10. This is in fact exactly what occurs generally in all spline joints that are coupled by a single row of balls which are seated in a race in contact with both sides of said race, without the provision of a return channel for the balls from one to the other end of the race. However, by providing two juxtaposed rows of transversely aligned balls in a common race, with each ball in said rows contacting not only a surface on the outer and the inner shaft, but also the adjacently positioned, transversely aligned ball in the juxtaposed row of balls, none of the balls of either row bears at point 44 against a stationary surface or a surface that may impart an opposite rotational moment to the balls. To the contrary, at point 44 the left balls 30a all bear against points of the adjacent balls in the juxtaposed row 26b, that tend to move in the same direction and which therefore aid rather than impede rotation of the left balls 30a in the direction indicated by arrow 54. The identical situation exists with regard to the balls 30b in the right row 26b. Whenever the inner shaft 12 is moved in the direction of the person who views Figure 4, a rotational moment is applied to each ball 30b at point 48 as indicated by the arrow head 55 in Figure 4; and this moment causes each of the balls 30b to turn in the direction indicated by the arrow 56 about an axis Y that passes through the point 46 whereat the ball contacts the surface of the upper race 14, and intermediately of the points 44 and 48 extending in a manner substantially symmetrical to the axis of rotation X of the directly adjacent left ball 30a. Thus, as pointed out hereinbefore, at their contact points 44, the balls 30a and 30b move in the same directions as indicated by the arrow ends 58a and 58b, and aid, rather than impede each other in their rotary motions. As a result thereof, each two juxtaposed balls in the twin rows 26a and 26b turn freely about the axes X and Y respectively, as the inner shaft is shifted relatively to the outer shaft 10. When turning in this manner, the balls are in rolling contact with the surface of the race 16 in the inner shaft, so that there is practically no rubbing or sliding friction set up between the balls and the race in the inner shaft; and since the points 40 and 46, respectively, whereat the balls contact the race in the outer shaft section, are points of zero velocity of the ball surfaces because the axes of rotation X and Y pass through said points, any rubbing or sliding friction of the balls with the surface of the race in the outer shaft section is insignificant. Hence, by the simple expedient of coupling two interengaged shafts of the type referred to for rotation in unison by twin rows of balls located in a common race, with the individual balls in each row not only in contact with the surfaces of the races in both interengaged shafts, but also with the adjacent ball in the juxtaposed row, it is possible to shift said shafts relative to each other along a common axis of rotation without setting up harmful rubbing friction such as may impair their intended performance and shorten their useful span of life, and without going to the expense and complexity of providing in one of the coupled shafts a return channel for circulation of the balls, even though a substantial torque may be applied to one or the other of said shafts. I have found that the best results are obtained when the arrangement is such that the axes X and Y intersect each other at right angles. However, my invention is not limited to arrangements wherein the rotational axes of the balls intersect each other at right angles, and satisfactory results may be obtained with arrangements wherein the axes X and Y intersect at more acute or more obtuse angles than 90°. I have also found it to be of advantage to slightly space each two consecutive balls in the rows 26a and 26b from each other. This may be accomplished in any suitable manner, such as by means of thin transverse partitions (not shown) that may extend from one or the other of the congruent races into the space between consecutive balls.

Figure 5:
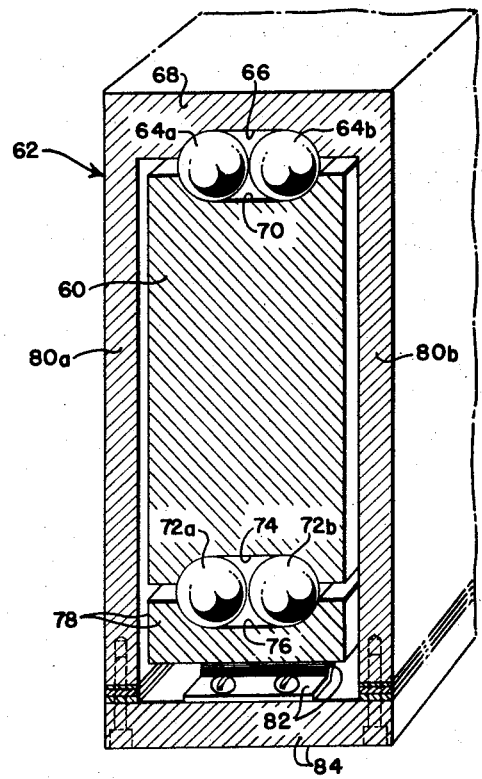
Figure 5 is a vertical cross section through another embodiment of the invention.

My invention is not limited to spline joints and like interengaged shaft assemblies. The principles of my invention may usefully be employed wherever it is desirable to shift two interengaged members relative to each other with a minimum of friction. Thus, Figure 5 illustrates a carriage arrangement wherein a stationary rail or guide track 60 of rectangular contour is to support an outer structure 62 of C-shaped cross section for longitudinally sliding movement. Twin rows of balls 64a and 64b are interposed between a groove or race 66 provided in the inner surface of the center bar 68 of the carriage 62 and a congruent groove or race 70 provided in the upper end face of the rail 60. Similarly, another double row of balls 72a and 72b is interposed between a groove 74 in the lower end face of the rail 60 and a congruent groove 76 provided in a bar 78. The bar 78 is slidably received between the shanks 80a and 80b of the carriage 62 below the lower end of the rail 60, and is urged against said rail by suitable spring means indicated at 82, which bear against a bottom plate 84 that may be bolted to the lower ends of the side bars 80a and 80b.

In practice a crane structure (not shown) may be supported from the carriage 62 and the carriage may selectively be moved in either direction on and along the rail with a minimum of frictional impedance and a minimum of wear of the balls and the race surfaces in spite of lateral stress to which the carriage may be subjected during practical use.

While I have explained my invention with the aid of certain preferred embodiments thereof, it will be understood that the principles of my invention are not limited to the specific constructional details shown or described, which may be departed from without departing from the scope and spirit of my invention. Thus, by making the congruent races of two interengaged shaft sections, of the type referred to, of helical conformation with two juxtaposed rows of balls contained in said helical races, the principles of my invention may be employed to reduce friction and provide ease of operation in screws and screw drive mechanisms of all kinds.

I claim:

1. An assembly comprising an outer hollow member having a race provided in its inner surface, an inner member disposed within said hollow member and having a race provided in its surface in a position congruent with the race in said outer member, and means permitting relative movement of said members in the direction of said races while preventing displacement of said members relative to each other in other directions, including two juxtaposed rows of balls located in and between said races with each two juxtaposed balls in separate rows in contact with each other and with the surfaces of both said races.

2. An assembly comprising an outer hollow member having a race provided in its inner surface, an inner member disposed within said hollow member and having a race provided in its surface in a position congruent with the race in the inner surface of said outer member, a pair of juxtaposed rows of balls located in and between said races with each two juxtaposed balls in separate rows in contact with each other and with the surfaces of both said races, and means at the opposite ends of one of said races confining the juxtaposed rows of balls therein.

3. A spline joint comprising an outer tubular shaft having an axially extending race provided in its inner surface, an inner shaft disposed coaxially within said tubular shaft and having an axially extending race provided in its surface in a position congruent with the race in the inner surface of said outer shaft, a pair of juxtaposed rows of balls located in and between said races with each two juxtaposed balls of separate rows in contact with each other and with the surfaces of both said races, and means at opposite ends of one of said races confining the juxtaposed rows of balls therein.

4. A spline joint comprising an outer tubular shaft having a plurality of axially extending races in its inner surface spaced equal angular distances apart from each other, an inner shaft disposed coaxially within said tubular shaft and having an equal number of axially extending races in its outer surface in positions congruent with the races in the inner surface of said tubular shaft, a pair of juxtaposed rows of balls located in and between each two congruent races, with each two juxtaposed balls of separate rows in contact with each other and with the surfaces of the two races within which they are located, and means blocking the opposite ends of one of each of said congruent races.

References Cited in the file of this patent

UNITED STATES PATENTS

| | | |
|---|---|---|
| 2,343,575 | Penney | Mar. 7, 1944 |
| 2,525,712 | Neighbour | Oct. 10, 1950 |
| 2,546,375 | Schlicksupp | Mar. 27, 1951 |
| 2,672,378 | McVey | Mar. 16, 1954 |
| 2,908,152 | Anderson | Oct. 13, 1959 |